(12) United States Patent
Zhang

(10) Patent No.: US 9,743,499 B2
(45) Date of Patent: Aug. 22, 2017

(54) DIMMING CIRCUIT FOR LED

(71) Applicant: SHENZHEN CHINA STAR OPTOELECTRONICS TECHNOLOGY CO., LTD., Shenzhen, Guangdong (CN)

(72) Inventor: Hua Zhang, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 14 days.

(21) Appl. No.: 14/111,778

(22) PCT Filed: Jun. 30, 2013

(86) PCT No.: PCT/CN2013/078533
§ 371 (c)(1),
(2) Date: Jul. 12, 2016

(87) PCT Pub. No.: WO2014/183330
PCT Pub. Date: Nov. 20, 2014

(65) Prior Publication Data
US 2016/0374184 A1    Dec. 22, 2016

(30) Foreign Application Priority Data

May 17, 2013 (CN) .......................... 2013 1 0185888

(51) Int. Cl.
*H05B 37/02* (2006.01)
*H05B 33/08* (2006.01)
*G09G 3/34* (2006.01)

(52) U.S. Cl.
CPC ....... *H05B 37/0281* (2013.01); *G09G 3/3426* (2013.01); *H05B 33/0812* (2013.01);
(Continued)

(58) Field of Classification Search
CPC ........... H05B 33/0827; H05B 33/0815; H05B 33/0845; H05B 33/0851; H05B 33/0812;
(Continued)

(56) References Cited

U.S. PATENT DOCUMENTS 6,621,235 B2    9/2003  Chang
7,919,936 B2 *  4/2011  Liu .................... H05B 33/0827
                                                315/185 R
(Continued)

FOREIGN PATENT DOCUMENTS

CN    101169918 A    4/2008
CN    101888757 A    11/2010
(Continued)

OTHER PUBLICATIONS

Min Wang, the International Searching Authority written comments, Feb. 2014, CN.

*Primary Examiner* — Vibol Tan

(57) ABSTRACT

A LED dimming circuit, configured to control a plurality of LED strings to light up at different moment in a cycle, the circuit includes several sets of LED strings connected in parallel respectively; driving circuits coupled to the LED strings and driving them to light up; control circuits coupled to the driving circuits to control the LED series to light up by inputting pulse width modulated signals to the driving circuits; the control circuit includes a voltage comparator and a delay circuit, the voltage comparator is coupled between the delay circuit and the driving circuit, each delay circuit and each driving circuit are connected in series thereof, the delay circuit converts the pulse width modulated signal to a delay signal, the voltage comparator converts the sine wave signal to a square wave or a rectangular wave signal.

10 Claims, 2 Drawing Sheets

(52) U.S. Cl.
CPC ..... *H05B 33/0818* (2013.01); *H05B 33/0827* (2013.01); *H05B 33/0842* (2013.01); *H05B 33/0845* (2013.01); *G09G 2310/024* (2013.01); *G09G 2320/064* (2013.01); *Y02B 20/346* (2013.01)

(58) Field of Classification Search
CPC ............ H05B 33/0842; H05B 33/0887; H05B 37/02; G09G 3/3406; G09G 2320/064; Y02B 20/346; Y02B 20/347; Y02B 20/345
See application file for complete search history.

(56) References Cited

U.S. PATENT DOCUMENTS

| | | | |
|---|---|---|---|
| 2009/0189842 A1* | 7/2009 | Huang | G09G 3/342 345/102 |
| 2011/0164069 A1 | 7/2011 | Thompson et al. | |
| 2013/0050174 A1* | 2/2013 | Kim | G09G 3/006 345/212 |

FOREIGN PATENT DOCUMENTS

| | | |
|---|---|---|
| CN | 101916547 A | 12/2010 |
| CN | 201663730 U | 12/2010 |
| CN | 102354484 A | 2/2012 |
| CN | 102497710 A | 6/2012 |
| CN | 103096598 A | 5/2013 |
| JP | H08335057 A | 12/1996 |
| KR | 20090130496 A | 12/2009 |
| WO | WO2008102479 A1 | 8/2008 |

* cited by examiner

DIMMING CIRCUIT FOR LED

FIELD OF THE INVENTION

The present invention relates to driving circuits of backlight modules, and more particularly to dimming circuits for light emitting diode ("LED").

BACKGROUND OF THE INVENTION

Please refer to FIG. 1, which is a circuit diagram of a backlight driving circuit for LEDs according to a prior art, and the light adjustment thereof is controlled by a pulse width modulated signal (PWM dimming signal). When the voltage of the PWM dimming signal has a constant DC high level, the MOS tubes, conducted with a constant current of the LEDs and connected in series with the LEDs in the IC, is always in the conducting state, the current of the LEDs is constant, then their brightness is the highest. When to dimmer, because the PWM dimming signal has a rectangular wave, the MOS tubes in the IC switches between on and off, the LED's current has also a rectangular wave, and because the average value of the LED's current declines, the brightness is reduced.

During the dimming, the PWM signals of every LED strings are same, that means the MOS tubes connected in series with the LEDs switch between on and off at the same time. In each working cycle, because of the large output power range, the current of the inductors may change frequently between the maximum and minimum values, which generates noise, impacts the components of the circuit, and results to a big wave of output voltage, so the circuit is unstable.

SUMMARY OF THE INVENTION

On account of the lack of the prior art, the object of the present invention is to provide a LED dimming circuit, configured to control several sets of LED strings of a controllable backlight module to light up at different moment in a cycle, the circuit has a constant output power without any instability.

The present invention provides a LED dimming circuit configured to control a plurality of LED strings 100 to light up at different moment in a cycle and comprises:

several sets of LED strings connected in parallel respectively;

driving circuits coupled to the LED strings to drive them to light up;

control circuits coupled to the driving circuits to control the LED series to light up by inputting pulse width modulated signals (PWM dimming signal) to the driving circuits;

The control circuit comprises a voltage comparator and a delay circuit, the voltage comparator is coupled between the delay circuit and the driving circuit, each delay circuit and each driving circuit are connected in series, the delay circuit converts the PWM dimming signal to a delay signal, and then the voltage comparator converts the sine wave signal of the delay signal to a square wave or a rectangular wave signal, which is transferred to the driving circuit to sequentially light up the corresponding LED strings.

Perfectly, in two adjacent control circuits, an output end of a previous voltage comparator is connected in series with its next delay circuit, therefore to transfer the delay signal output from the previous set to be delayed again. There are 3 sets of the delay circuits that connected in series. The delay circuit is a RC delay circuit, the PWM dimming signal is input to an input end of the delay circuit, and an output end of which is coupled to a high level end of the voltage comparator.

The delay time between two adjacent PWM dimming signals is set in a high level interval of the PWM dimming signal, therefore, once a previous set of LED string is turned off, the next one is turned on immediately.

The value of the constant comparing voltage is between the high level and the low level of the outputting level of the pulse width modulated signal. Perfectly, the voltage range of the PWM dimming signal is 0-3.3V, and the constant comparing voltage range is 1.6-3.3V.

In the RC delay circuit, the values of the resistance R and the capacitor C are inversely proportional to the change rate of the input voltage of the voltage comparator, and the constant comparing voltage is directly proportional to the delay time. The delay time can be adjusted by adjusting the values of R, C and the constant voltage.

Compared with the prior art, the LED dimming circuit of the present invention provides a delay circuit, which can control sequentially the PWM dimming signal, then the PWM dimming signal output from the voltage comparator is transmitted to a next set of delay circuit to be delayed again, and therefore to obtain a stepped delay PWM dimming signal, which is output respectively to control each LED string, so that the start time is staggered each other, the LEDs are turned on successively, which makes the outputting power of the whole circuit constant and avoids the voltage's instability caused by being started of multiple LED strings at the same time. The current's variation range of the inductors is reduced accordingly, which avoids the circuit's instability during the dimming process. Meanwhile, because the delay time is less than the high potential interval of the PWM dimming signal, once a previous set of LED string is switched off, the next one is switched on immediately, the LED strings cannot be switched on and off simultaneously. In a same working cycle of this LED dimming circuit, the lighting time is distributed uniformly to make sure a constant outputting power.

DETAILED DESCRIPTION OF THE PREFERRED EMBODIMENTS

Figure 1:
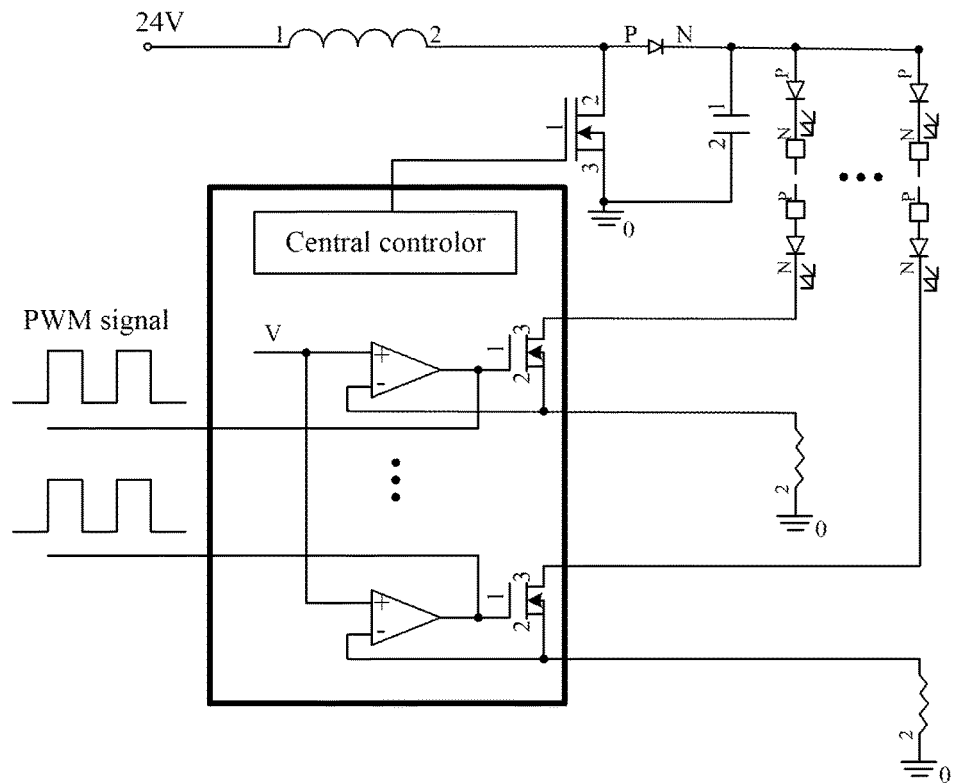
FIG. 1 is a circuit diagram of a dimming circuit for LEDs according to a prior art.

Please refer to FIG. 1, the present invention provides a dimming circuit for LEDs, configured to control a plurality of LED strings 100 to light up at different moment in a working cycle, the circuit includes:

several sets of LED string 100 connected in parallel respectively;

driving circuit 200 coupled to the LED strings 100 to drive them to light up;

control circuit 300 coupled to the driving circuit 200 to control the LED series 100 to light up by inputting the pulse width modulated signal (PWM dimming signal) to the driving circuit 200;

The control circuit 300 includes a voltage comparator 301 and a delay circuit 302. The voltage comparator 301 is coupled between the delay circuit 302 and the driving circuit 200, each delay circuit 302 and each driving circuit 200 are connected in series. The delay circuit 302 converts the PWM dimming signal to a delay signal, and then the voltage comparator 301 converts the sine wave signal of the delay signal to a square wave or a rectangular wave signal, the square wave or the rectangular wave signal is transmitted to the driving circuit 200 to sequentially light up the corresponding LED strings 100.

The LED strings 100 are connected in parallel between the driving circuit 200 and a boost circuit 400. The control circuit 300 inputs the PWM dimming signal to the boost circuit 400 to control the lighting time and intensity of the LED strings 100. Multiple LED modules are connected in series in each LED string.

The general control circuit has several sets of circuits, and so does the general driving circuit, the control circuit 300 of each set is connected in series with the corresponding driving circuit 200, and the driving circuit 200 of each set is connected in series with the corresponding LED string. The lighting time and intensity of each set of LED string are controlled respectively by adjusting the on-off time of each set of driving circuit 200 by each set of control circuit 300.

Wherein, the control circuit 300 includes a voltage comparator 301 and a delay circuit 302 connected in series. The voltage comparator 301 is coupled between the delay circuit 302 and the driving circuit 200. The delay circuit 302 can be realized by, for example, a RC delay circuit, an integrated IC with delay function, or a delay effect according with delay time achieved by a processor that outputs a predefined signal. In this embodiment, there are 3 sets of the delay circuits.

Figure 2:
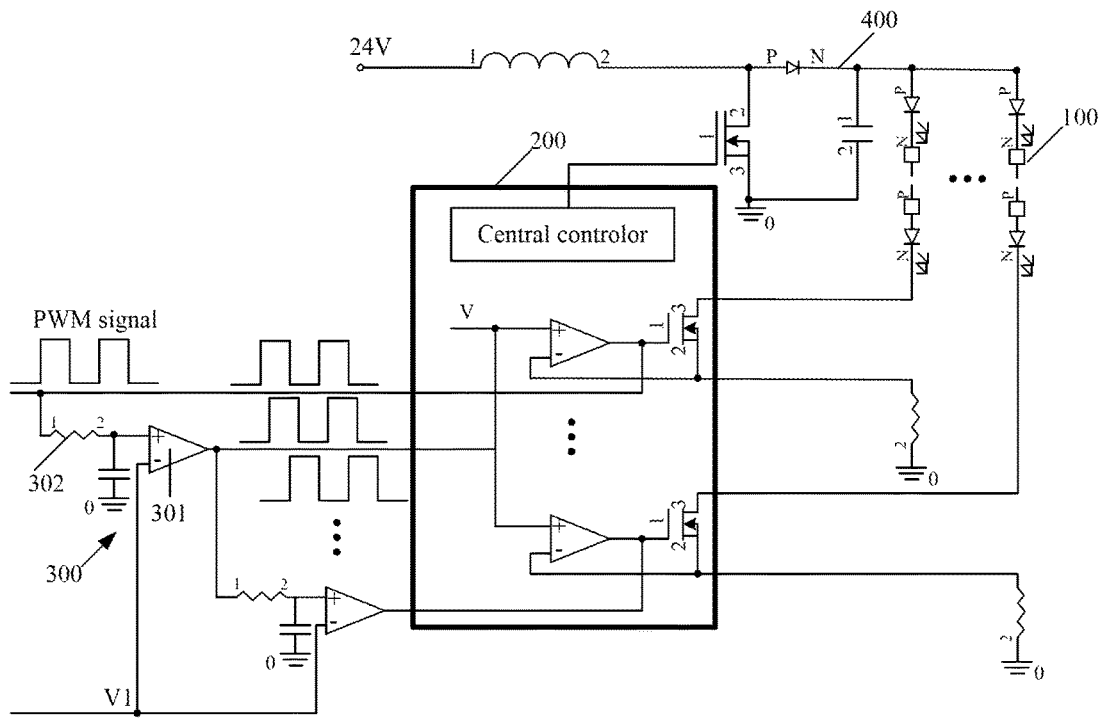
FIG. 2 is a circuit diagram of a dimming circuit for LEDs according to the present invention.
Figure 3:
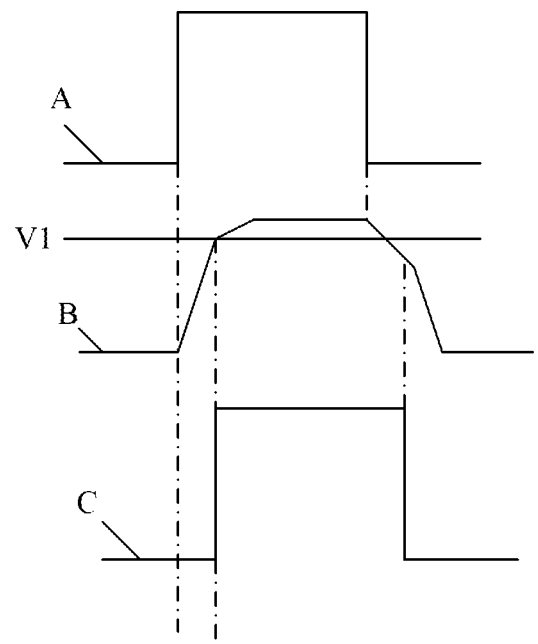
FIG. 3 is a schematic view showing the waveform adjustment of PWM dimming signal of the dimming circuit for LEDs according to the present invention.

Please refer to FIGS. 2 and 3, and as shown in the FIG. 3, the signal A is an initial PWM dimming signal, V1 represents the constant comparison voltage, the signal B is the PWM dimming signal produced by the RC delay circuit, and the signal C is the delayed PWM dimming signal output from the voltage comparator 301. An initial PWM dimming signal (signal A) is input to the delay circuit 302 of the control circuit 300, and the initial dimming signal is converted into the signal B via the delay circuit 302 and the adjustment of the resistor R and the capacitor C, which extend the period of the rising-edge and the falling-edge. Then, the signal B is input to a high potential end of the voltage comparator 301. A low potential end of the voltage comparator 301 is conducted with a constant comparing voltage V1, which makes the outputting voltage rectified by the voltage comparator 301 remain positive. Since the rising-edge and the falling-edge of the PWM dimming signal become more gentle, the voltage comparator 301 has a low level output if the voltage value of the PWM dimming signal rises between that of the low voltage and the comparing voltage, and the voltage comparator 301 has a high level output and generates a signal C if the voltage value of the PWM dimming signal continues rising.

In order to adjust and control the lighting time of the adjacent LED string 100, in a adjacent control circuit 300, an output end of a previous voltage comparator 301 is connected in series with the next delay circuit 302, therefore to transfer the delay signal output from the previous set to the next set of the delay circuit 302 to be delayed again. In this way, the delay circuit series 302 and the voltage comparator 301 are respectively connected in series in each set of control circuit 300, and the PWM dimming signal adjusted by the previous set of voltage comparator 301 is input to the next set of delay circuit 302 be delayed again. The re-delayed PWM dimming signal is then input to another set of LED string 100, and another delay PWM dimming signal is obtained via the next set of delay circuit. Preferably, each set of LED string 100 has a same delay time. Thus, a plurality of delayed PWM dimming signals can be obtained and transmitted respectively to the control circuits 300 of each LED string 100. The lighting times of each set of LED strings 100 are different and successively extended, so that multiple sets of LED strings 100 are sequentially turned on in a cycle by the adjustment of the lighting time of each delayed PWM dimming signal onto the LED string 100, therefore, the circuit has a constant output power without any instability.

Figure 4:
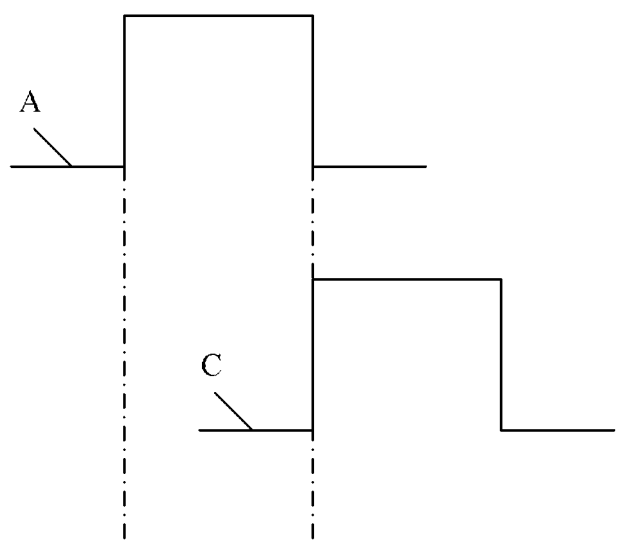
FIG. 4 is a schematic view showing the time delay comparison of PWM dimming signal of the dimming circuit for LEDs according to the present invention.

Please refer to FIG. 4, in the present invention, the signal A is an initial PWM dimming signal, the signal C is a delayed dimming signal via the processes of delay and voltage comparison. The delay time is set in the high level interval of the PWM dimming signal, therefore to make sure once one set of LED string is disconnected, the next one is connected, that means, each LED string isn't turned on and turned off simultaneously.

In the present invention, the constant voltage is set between the high level and the low level of the input voltage of the PWM dimming signal. Perfectly, the voltage range of the PWM dimming signal is 0-3.3V, and the comparison voltage range is 1.6-3.3V.

In the RC delay circuit, the values of the resistance R and the capacitor C are inversely proportional to the change rate of the input voltage of the voltage comparator 301. That means, the higher the values of the resistance R or the capacitor C, the slower the value change rate of the high potential end of the voltage comparator 301 from a low level up to a higher level, or from a high level down to a lower level. In the situation that the constant comparing voltage is constant, the delay time of the adjacent PWM dimming signal becomes longer along with that the waveform of the delayed PWM dimming signal becomes gentle. In addition, the constant comparing voltage is directly proportional to the delay time, which means, the higher the constant voltage value, the longer the delay time. Thus, the delay time is adjusted by adjusting the values of R, C and the constant voltage value of the voltage comparator 30, and therefore to control the lighting time difference of each set of LED string.

What is claimed is:

1. A LED dimming circuit, configured to control a plurality of LED strings to light up at different moment in a cycle, comprising:
several sets of LED string connected in parallel respectively;
driving circuits coupled to said LED strings to drive them to light up;
control circuits coupled to said driving circuits to control the LED series to light up by inputting pulse width modulated signals (PWM dimming signal) to said driving circuits;
wherein each of said control circuits comprises a voltage comparator and a delay circuit, said voltage comparator is coupled between said delay circuit and said driving circuit, each said delay circuit and each said driving circuit are connected in series thereof, said delay circuit converts said PWM dimming signal to a delay signal, and then said voltage comparator converts a sine wave signal of said delay signal to a square wave or a rectangular wave signal, which is transferred to said driving circuit to sequentially light up said corresponding LED strings, wherein an output end of a previous voltage comparator is connected in series with its next delay circuit in two adjacent control circuits, therefore to transfer the delay signal output from the previous set to be delayed again.

2. The LED dimming circuit according to claim 1, wherein the delay time between said two adjacent pulse width modulation signals is set in a high level interval of said pulse width modulated signal.

3. The LED dimming circuit according to claim 2, wherein said pulse width modulated signal is input to an input end of said delay circuit, and an output end of which is coupled to a high level end of said voltage comparator.

4. The LED dimming circuit according to claim 3, wherein a low level end of said voltage comparator is coupled to a constant comparing voltage.

5. The LED dimming circuit according to claim 4, wherein said constant comparing voltage is between the high level and the low level of the output level of the pulse width modulated signal.

6. The LED dimming circuit according to claim 5, wherein the voltage range of said pulse width modulated signal is 0-3.3V.

7. The LED dimming circuit according to claim 5, wherein the constant comparing voltage range is 1.6-3.3V.

8. The LED dimming circuit according to claim 1, wherein there are 3 sets of said delay circuits connected in series.

9. The LED dimming circuit according to claim 1, wherein said delay circuit is a RC delay circuit.

10. The LED dimming circuit according to claim 9, wherein the values of the resistance R and the capacitor C are inversely proportional to a change rate of the input voltage of said voltage comparator in said RC delay circuit.

* * * * *